United States Patent [19]
Tadokoro et al.

[11] Patent Number: 4,459,809
[45] Date of Patent: Jul. 17, 1984

[54] TURBOCHARGER BYPASS CONTROL FOR INTERNAL COMBUSTION ENGINES

[75] Inventors: Tomoo Tadokoro; Masami Nakao; Haruo Okimoto; Masato Iwaki, all of Hiroshima, Japan

[73] Assignee: Toyo Kogyo Co., Ltd., Hiroshima, Japan

[21] Appl. No.: 351,440

[22] Filed: Feb. 23, 1982

[30] Foreign Application Priority Data

Feb. 24, 1981 [JP] Japan ................. 56-26621

[51] Int. Cl.$^3$ ............................................. F02B 37/12
[52] U.S. Cl. ....................................... 60/602; 60/611
[58] Field of Search ................. 60/600, 601, 602, 603, 60/611

[56] References Cited

U.S. PATENT DOCUMENTS

| | | | | |
|---|---|---|---|---|
| 4,202,176 | 5/1980 | Mezger | ................. | 60/600 |
| 4,222,240 | 9/1980 | Castellano | ................. | 60/611 |
| 4,270,356 | 6/1981 | Will et al. | ................. | 60/602 |
| 4,392,352 | 7/1983 | Stumpp et al. | ................. | 60/602 |

FOREIGN PATENT DOCUMENTS 55-84818  6/1980  Japan ....................... 60/602

Primary Examiner—Michael Koczo
Attorney, Agent, or Firm—Fleit, Jacobson, Cohn & Price

[57] ABSTRACT

An engine having a turbo-supercharger comprised of a blower in the intake passage and an exhaust gas turbine in the exhaust passage. A charging pressure limiting device includes a pressure relief passage in the intake system or a turbine bypass passage in the exhaust system which is provided with a control valve. A control circuit is provided for limiting the peak charging pressure. The control circuit includes a limit signal generating circuit for providing a limit signal which decreases in response to an increase in the engine speed under a high speed range, a comparator for comparing the limit signal with the actual charging pressure signal and producing a control signal when the charging pressure signal reaches or exceeds the limit signal so that the charging pressure does not exceed the limit value which decreases in response to an increase in the engine speed under a high speed range.

7 Claims, 6 Drawing Figures

TURBOCHARGER BYPASS CONTROL FOR INTERNAL COMBUSTION ENGINES

The present invention relates to supercharged internal combustion engines, and more particularly to supercharger control means for such engines.

Conventionally, in automobile engines having intake systems provided with superchargers, it has been common practice to provide means for limiting the supercharged intake pressure for avoiding undesirable effects on the durability of the engines due to an excessive pressure. In one type of such engines, the intake system has a pressure relief device so that a portion of the intake gas be relieved of the intake passage when the supercharged intake pressure exceed a limit value to thereby maintain the intake pressure within the limit. As another type, the U.S. Pat. No. 4,202,176 issued to Hans Mezzer on May 13, 1980 discloses a turbo-supercharger in which the exhaust system includes a bypass line by-passing the blower driving exhaust gas turbine and a control valve which is opened when the charging pressure reaches a predetermined value to allow a portion of the exhaust gas to pass through the bypass line.

In either type, the supercharging system is such that the charging pressure is maintained substantially constant after the pressure has reached a predetermined value. It should however be noted that even with this control it has not been possible to satisfactorily avoid overheating of the engine under high speed engine operation because the intake gas flow in a unit time increases in response to an increase in the engine speed even though the charging pressure is maintained within the limit. Further, under high speed operation, there is a corresponding increase in the exhaust gas flow in a unit time which inherently causes an increase in the exhaust temperature. Thus, there is a strong possibility of thermal overloading of the catalyst in the exhaust system and the exhaust gas turbine if they are provided.

It is therefore an object of the present invention to provide an engine supercharging system which can eliminate engine overheating and excessive exhaust gas temperature even under high speed engine operation.

Another object of the present invention is to provide an engine supercharger which does not have adverse effects on the durability of the engine and the function of the catalyst provided in the exhaust system.

A further object of the present invention is to provide an engine supercharging system in which an optimum control of the charge pressure can be establisehd through electronic control means.

According to the present invention, the above and other objects can be accomplished by an internal combustion engine comprising combustion chamber means, intake passage means leading to said combustion chamber means for supplying intake charge thereto, exhaust passage means leading from said combustion chamber means for passing exhaust gas, supercharging means provided in said intake passage means, charging pressure limiting means for limiting charging pressure in said intake passage means downstream of said supercharging means, said charging pressure limiting means including means for adjusting the charging pressure, engine speed sensing means for detecting engine speed and producing an engine speed signal, charging pressure sensing means for detecting the charging pressure in said intake passage means downstream of said supercharging means and producing a charging pressure signal, and control means adapted for receiving said engine speed signal and said charging pressure signal and producing an output for actuating said adjusting means by providing a limit signal corresponding to a limit value of the charging pressure which decreases in response to an increase in the engine speed at least under a high speed engine operation, and comparing said charging pressure signal with said limit signal to provide said output for actuating said adjusting means when said charging pressure reaches the limit value so that the charging pressure does not exceed the limit value. The charging pressure adjusting means may be pressure relief means provided in the intake passage means downstream of the supercharging means for relieving a portion of the intake charge from the intake passage means downstream of the supercharging means to the intake passage means upstream of the supercharging means when the charging pressure in said intake passage means downstream of the supercharging means reaches the limit charging pressure.

Where the engine includes exhaust turbine means provided in said exhaust passage means for driving the supercharging means provided in the intake passage means, the charging pressure adjusting means may comprise bypass passage means bypassing said exhaust turbine means and control valve means for controlling gas flow in said bypass passage means. The control means may be embodied in the form of a digital computer and there may be provided electrically operated actuating means which is operated by the output of the control means.

The above and other objects and features of the present invention will become apparent from the following descriptions of preferred embodiments taking reference to the accompanying drawings, in which.

Figure 1:
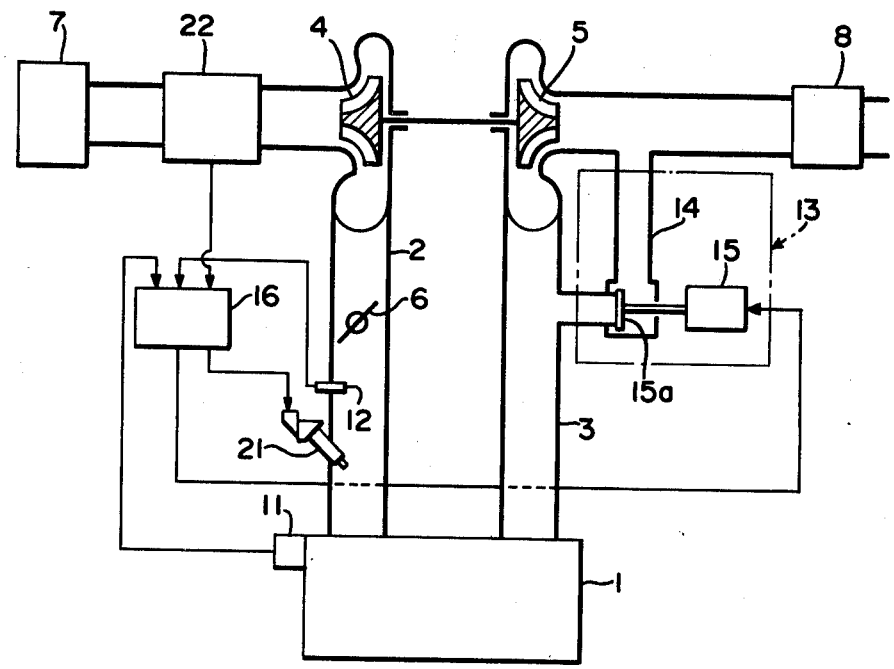
FIG. 1 is a schematic sectional view of an engine having a turbo-supercharger in accordance with one embodiment of the present invention.

Referring to the drawing, particularly to FIG. 1, there is shown an engine having an engine block 1 in which a combustion chamber is defined as well known in the art. The engine further has an intake passage 2 and an exhaust passage 3 both communicating with the combustion chamber in the cylinder block 1. In the intake passage 2, there is provided a supercharging blower 4 which is connected with an exhaust gas turbine 5 provided in the exhaust passage 3. The intake passage 2 is provided downstream of the blower 4 with a throttle valve 6 and has an air cleaner 7 at the upstream end thereof. The exhaust passage 3 is provided with a catalytic converter 8. The intake passage 2 is further provided downstream of the throttle valve 6 with a fuel injection nozzle 21. An airflowmeter 22 provided in the intake passage upstream of the blower 4 detects the airflow and applies a signal to a control circuit 16 which determines the amount of fuel to be supplied through the nozzle 21 to the engine.

In order to limit the maximum charger pressure, there is provided an adjusting device 13 including a bypass passage 14 which is connected with the exhaust passage 3 at one end upstream of and at the other end downstream of the turbine 5. In the bypass passage 14, there is provided a control valve 15a which is connected with an electrically operated valve actuator 15. The valve actuator 15, which may be of a proportional solenoid type, is adapted to be operated by an output of the control circuit 16.

The engine is provided with an engine speed sensor 11 for detecting the engine speed and producing an engine speed signal which is applied to the control circuit 16. Further, in the intake passage 2 downstream of the throttle valve 6, there is provided a charge pressure sensor 12 for detecting the charge pressure in the intake passage downstream of the throttle valve 6 and producing a charge pressure signal which is applied to the control cirucuit 16.

Figure 2:
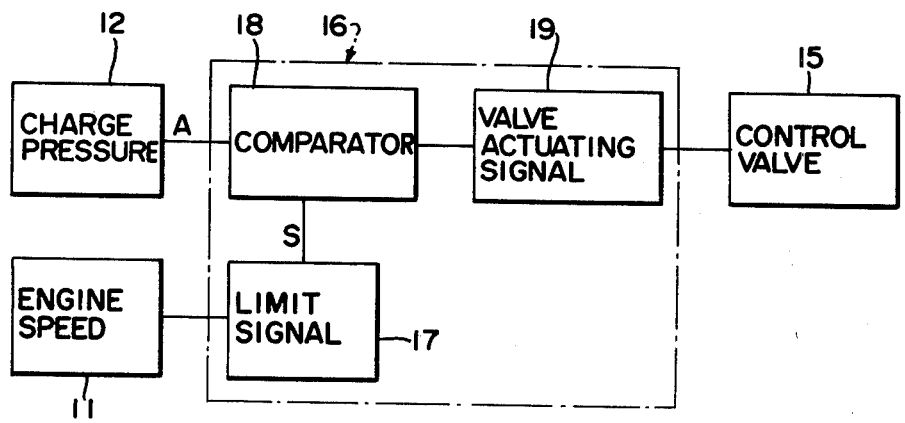
FIG. 2 is a diagram showing one example of the charging pressure control system in accordance with the present invention.
Figure 3:
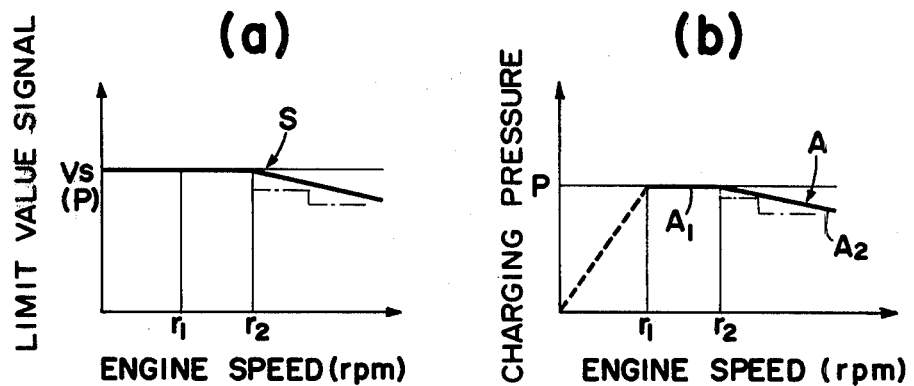
FIG. 3(a) shows one example of the charging pressure limit signal.
FIG. 3(b) shows the maximum charging pressure.

Referring to FIG. 2, it will be noted that the control circuit includes a limit signal generator 17 which receives the engine speed signal from the sensor 11 and produces a limit value signal S as shown for example in FIG. 3(a). In the example shown in FIG. 3(a), the limit value signal S is constant with the engine speed lower than the value $r_2$ but it gradually decreases in response to an increase in the engine speed above the engine speed $r_2$. Alternatively, the signal S may be stepwisely decreased as shown by a dotted line. The signal S from the generator 17 is applied to a comparator 18 which is also applied with the charge pressure signal from the charge pressure sensor 12. The comparator 18 compares the charge pressure signal with the limit value signal and produces a control signal when the former is greater than the latter. The control signal is applied to a driving circuit 19 which produces an output for operating the control value 15.

In operation, when the throttle valve 6 is at a low or medium opening position, the engine speed is relatively low and the limit signal generator 17 produces a signal of a value Vs as shown in FIG. 3(a). Since the charge pressure at this instance is lower than the limit pressure P corresponding to the limit value Vs as shown by a dotted line in FIG. 3(b), the driving circuit 19 does not produce an output for energizing the valve actuator 15.

As the engine increases, the charging pressure increases in response to an increase in the throttle valve opening as shown by the dotted line in FIG. 3(b) and, at the engine speed $r_1$, the charging pressure reaches the limit value P so that a control signal is produced by the comparator 18 so that a valve actuating output is produced in the actuating circuit. The control signal takes a value substantially proportional to the difference between the charging pressure signal A and the limit value signal S so that the driving circuit 19 produces an output which is also proportional to the difference between the signals. The valve actuator 15 actuates the control valve 15a to an opening substantially proportional to the difference between the signals A and S. A part of the exhaust gas is therefore allowed to flow through the bypass passage 14 so that the driving power of the turbine S is correspondingly decreased so that the charging pressure does not exceed the limit value. With the engine speed below the value $r_2$, the limit value signal S is constant as described previously so that the charging pressure is maintained substantially constant between the engine speeds $r_1$ and $r_2$ as shown by $A_1$ in FIG. 3(b). With the engine speed above the value $r_2$, the limit value signal S decreases in response to an increase in the engine speed. Therefore, the peak charging pressure also decreases as shown by $A_2$ in FIG. 3(b).

Figure 5:
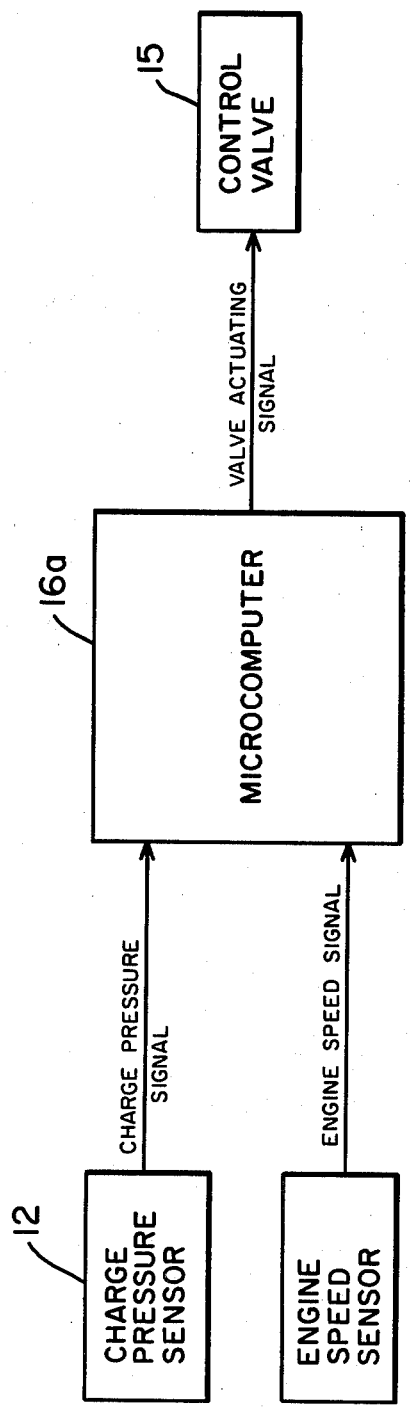
FIG. 5 is a schematic diagram of a control circuit including a microcomputer.

In supercharged engines for automobile use, the effect of the supercharger should be fully utilized in a specific speed range, for example around 3000 rpm., which is particularly important for acceleration, however, in a higher speed range, it is desirable to decrease the charge pressure for avoiding adverse effects on the durability of the engine. The aforementioned system accomplishes the desired function satisfactorily. The control circuit 16 may be substituted by a microcomputer 16a as shown in FIG. 5. In this instance, the limit value may be memorized in a memory and a similar control may be performed in accordance with the memory.

Figure 4:
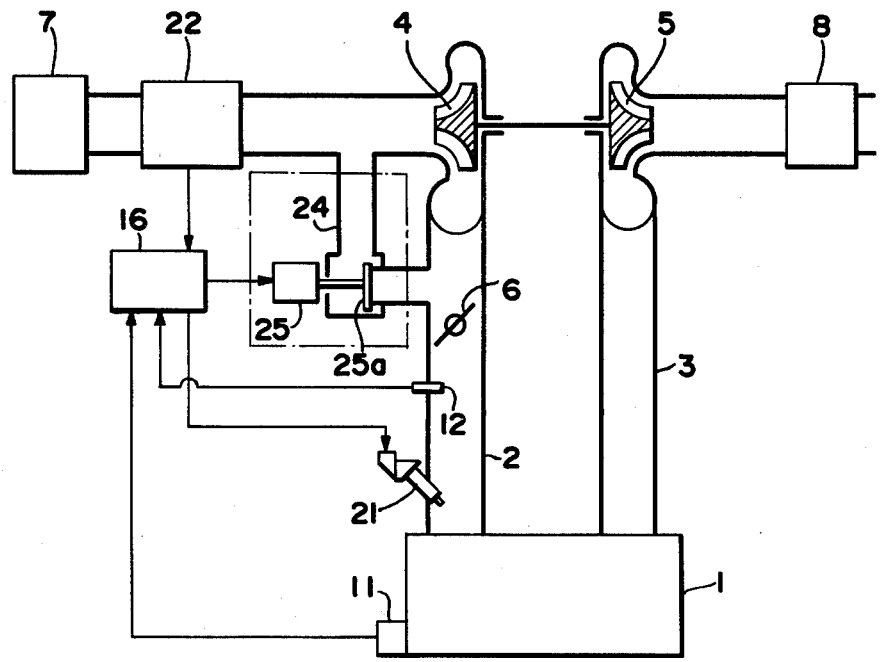
FIG. 4 is a schematic sectional view similar to FIG. 1 but showing another embodiment.

In FIG. 4, there is shown another embodiment in which like parts are designated by the same reference numerals. In this embodiment, the intake passage 2 is provided with a relief passage 24 which is connected at one end with the intake passage 2 upstream of the blower 4 and at the other end downstream of the blower 4. In the relief passage 24, there is a relief valve 25a which is actuated by a valve acutator 25 similar to the valve actuator 15 in the previous embodiment. The valve actuator 25 is energized by the output of the control circuit 16.

The invention has thus been shown and described with reference to specific embodiment, however, it should be noted that the invention is in no way limited to the details of the illustrated arrangements but changes and modifications may be made without departing from the scope of the appended claims.

We claim:

1. An internal combustion engine comprising combustion chamber means, intake passage means leading to said combustion chamber means for supplying intake charge thereto, exhaust passage means leading from said combustion chamber means for passing exhaust gas, supercharging means provided in said intake passage means, exhaust turbine means provided in said exhaust passage means for driving the supercharging means provided in the intake passage means, charging pressure limiting means for limiting charging pressure in said intake passage means downstream of said supercharging means, said charging pressure limiting means including charging pressure adjusting means comprising bypass passage means bypassing said exhaust turbine means and control valve means for controlling gas flow in said bypass passage means, engine speed sensing means for detecting engine speed and producing an engine speed signal, charging pressure sensing means for detecting the charging pressure in said intake passage means downstream of said supercharging means and producing a charging pressure signal, and control means adapted for receiving said engine speed signal and said charging pressure signal and producing an output for actuating said adjusting means by providing a limit signal corresponding to a limit value of the charging pressure which decreases in response to an increase in the engine speed above a predetermined engine speed value, and comparing means for comparing said charging pressure signal with said limit signal to provide said output for actuating said adjusting means when said charging pressure reaches the limit value so that the charging pressure does not exceed the limit value.

2. An engine in accordance with claim 1 in which said charging pressure adjusting means includes electrically operated actuator which is adapted to be operated by the output of said comparing means.

3. An engine in accordance with claim 1 in which said control means includes a limit signal generating circuit for providing said limit signal, a comparing circuit for comparing said charging pressure signal with said limit signal to produce a control signal, and a driving circuit which receives the control signal and produces said output, electromagnetic actuating means being provided for actuating said adjusting means under said output of the driving circuit.

4. An engine in accordance with claim 1 in which said control means includes a microcomputer having a memory for providing said limit signal.

5. An engine in accordance with claim 3, in which said limit signal generating circuit provides a limit signal which steplessly decreases in response to an increase in the engine speed above said predetermined value.

6. An internal combustion engine comprising combustion chamber means, intake passage means leading to said combustion chamber means for supplying intake charge thereto, exhaust passage means leading from said combustion chamber means for passing exhaust gas, supercharging means provided in said intake passage means, exhaust turbine means provided in said exhaust passages means for driving the supercharging means provided in the intake passage means, charging pressure limiting means for limiting charging pressure in said intake passage means downstream of said supercharging means, said charging pressure limiting means including charging pressure adjusting means comprising bypass passage means bypassing said exhaust turbine means and control valve means for controlling gas flow in said bypass passage means, engine speed sensing means for detecting engine speed and producing an engine speed signal, charging pressure sensing means for detecting the charging pressure in said intake passage means downstream of said supercharging means and producing a charging pressure signal, and control means adapted for receiving said engine speed signal and said charging pressure signal and producing an output for actuating said adjusting means by providing a limit signal corresponding to a limit value of the charging pressure which is substantially constant irrespective of a change in the engine speed below a predetermined value but decreases in response to an increase in the engine speed above said predetermined value, and comparing said charging pressure signal with said limit signal to provide said output for actuating said adjusting means when said charging pressure reaches the limit value so that the charging pressure does not exceed the limit value.

7. An internal combustion engine comprising combustion chamber means, intake passage means leading to said combustion chamber means for supplying intake charge thereto, exhaust passage means leading from said combustion chamber means for passing exhaust gas, supercharging means provided in said intake passage means, exhaust turbine means provided in said exhaust passage means for driving the supercharging means provided in the intake passage means, charging pressure limiting means for limiting charging pressure in said intake passage means downstream of said supercharging means to a predetermined maximum charging pressure, said charging pressure limiting means including charging pressure adjusting means comprising bypass passage means bypassing said exhaust turbine means and control valve means for controlling gas flow in said bypass passage means, engine speed sensing means for detecting engine speed and producing an engine speed signal, charging pressure sensing means for detecting the charging pressure in said intake passage means downstream of said supercharging means and producing a charging pressure signal, and control means for actuating said adjusting means in accordance with said engine speed signal and said charging pressure signal so that the maximum charging pressure is maintained substantially constant below a predetermined engine speed but is decreased in response to an increase in the engine speed above said predetermined speed.

* * * * *